(12) United States Patent
Kremer et al.

(10) Patent No.: US 6,244,407 B1
(45) Date of Patent: Jun. 12, 2001

(54) MULTI-DISK FRICTION DEVICE HAVING FORCED LUBRICATION ON DEMAND

(75) Inventors: John M. Kremer, Sterling Heights; R. Keith Martin, Imlay City; Graham Annear, Farmington Hills, all of MI (US); William J. Zdeblick, Geneva, IL (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/153,582

(22) Filed: Sep. 15, 1998

(51) Int. Cl.[7] .................................................. F16D 13/74
(52) U.S. Cl. .................................. 192/70.12; 192/113.35
(58) Field of Search ........................... 192/70.12, 113.35, 192/113.34, 85 AA

(56) References Cited

U.S. PATENT DOCUMENTS

| | | |
|---|---|---|
| 2,869,701 | 1/1959 | Yokel . |
| 3,612,237 * | 10/1971 | Honda ............................. 192/85 AA |
| 3,834,503 | 9/1974 | Maurer et al. ................... 192/113 B |
| 4,134,483 | 1/1979 | Horsch . |
| 4,205,739 | 6/1980 | Shelby et al. .................... 192/113 B |
| 4,270,647 | 6/1981 | Leber ............................... 192/113 B |
| 4,372,434 * | 2/1983 | Aschauer ........................ 192/85 AA |
| 4,667,798 | 5/1987 | Sailer et al. ..................... 192/70.12 |
| 4,827,784 | 5/1989 | Muller et al. ........................... 74/330 |
| 5,174,420 | 12/1992 | DeWald et al. ................... 188/264 E |
| 5,305,863 | 4/1994 | Gooch et al. ..................... 192/70.12 |
| 5,469,943 | 11/1995 | Hill et al. .......................... 188/264 F |
| 5,495,927 | 3/1996 | Samie et al. ...................... 192/70.12 |
| 5,538,121 | 7/1996 | Hering .............................. 192/70.12 |
| 5,577,588 | 11/1996 | Raszkowski . |
| 5,613,588 | 3/1997 | Vu ................................... 192/113.35 |
| 5,755,314 | 5/1998 | Kanda et al. ..................... 192/70.21 |
| 5,791,447 | 8/1998 | Lamela . |
| 5,810,142 | 9/1998 | Schaefer . |
| 5,813,508 | 9/1998 | Shaji . |

* cited by examiner

Primary Examiner—Rodney H. Bonck
(74) Attorney, Agent, or Firm—Bliss, McGlynn, P.C.; Greg Dziegielewski

(57) ABSTRACT

A friction device includes piston assembly is responsive to the pressure of fluid in an expandable chamber to move between disengaged and engaged positions thereby actuating a clutch pack to connect and disconnect drive and driven members. The piston assembly includes a main body having an outer ring annularly disposed about the main body. The outer ring includes at least one orifice extending therethrough. The outer ring is movable between a first position wherein the orifice is closed and the drive and driven members are disconnected and a second position where the orifice is open to allow the flow of pressurized fluid through the orifice and from the outer diameter of the clutch pack between the adjacent plates and disks to the inner diameter of the clutch pack to cool same when the drive and driven members are connected.

18 Claims, 4 Drawing Sheets

MULTI-DISK FRICTION DEVICE HAVING FORCED LUBRICATION ON DEMAND

BACKGROUND OF THE INVENTION

1. Field of the Invention

The present invention relates, generally, to friction devices such as clutch or brake assemblies for use in transmissions, differentials or brake systems. More specifically, the present invention relates to a multi-disk friction clutch or brake systems having selectively actuated lubrication for cooling the clutch on demand.

2. Description of the Related Art

Multi-disk friction devices are employed in a wide range of applications as clutches or brakes. For example, such friction devices are frequently used in land-based vehicles. Generally speaking, land vehicles require three basic components. These components include a power plant (such as an internal combustion engine), a powertrain, and wheels. The powertrain's main component is typically referred to as the "transmission." Engine torque and speed are converted in the transmission in accordance with the tractive-power demand of the vehicle. Transmissions include one or more gear sets which may include an inner sun gear, intermediate planet gears which are supported by their carriers and outer ring gears. Various components of the gear sets are held or powered to change the gear ratios in the transmission. The multi-disk pack clutch is a friction device which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks which are interleaved between one another. The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

The confronting faces of the interleaved plates and friction disks are covered with frictional surfaces. When a friction device is engaged, kinetic energy is converted into thermal energy and a considerable amount of heat is generated. If the frictional surfaces get too hot, they can burn which damages the friction surfaces and degrades the clutch or brake operational effectiveness. Accordingly, the heat generated when a friction device is engaged must be dissipated.

Multi-disk friction clutches and brake systems have traditionally relied on a continuous "splash" supply of coolant, typically automatic transmission fluid (ATF), to remove the heat generated during operation. Coolant is supplied at or near the inner diameter of the disks and moves radially outward across the friction surface under the influence of centrifugal forces. While the centrifugal forces are important to move the coolant between the engaged friction disks, because the perimeter of the plates is larger at the outer diameter than the inner diameter, the coolant tends to break up into droplets which reduces wetting of the friction surfaces and concomitantly reduces the cooling capacity of the fluid.

When the disks are not engaged, little or no cooling is usually required. However, with conventional cooling schemes employed in the related art, unneeded coolant is often supplied to the open clutch or brake. When this occurs, the coolant in the friction device is sheared by the interleaved plates and friction disks due to the differential rotational speeds of the drive and driven members which the clutch or brake bridges. This condition reduces the efficiency of the transmission through viscous shear losses in the fluid and ultimately results in lower fuel efficiency.

Additionally, when coolant is directed toward a friction device operating in an open pack mode wherein coolant is not needed, the coolant is not being used by friction devices which are engaged or otherwise require cooling. This also increases the volume of coolant needed for a given transmission, differential or brake system and unnecessarily requires increasing the capacity of the associated pump.

It is known in the related art to selectively provide coolant to the clutch pack when the friction device has been engaged and to selectively interrupt coolant to the clutch pack when the friction device is disengaged. However, in general, the systems that have been proposed in the related art suffer from the disadvantage that they are overly complex in operation or are too difficult to be manufactured in a cost-effective manner.

Accordingly, there remains a need in the art for a friction device which may be selectively cooled on demand using forced coolant flow such as when the clutch or brake is engaged and wherein coolant to the clutch or brake may be selectively interrupted when not needed, such as when the clutch or brake is disengaged. Additionally, there is a need in the art for such a friction device having a cooling scheme wherein the friction disks are fully wetted when they are engaged.

SUMMARY OF THE INVENTION

The present invention overcomes the disadvantages in the related art in a friction device having a drive member and a driven member which are rotatable about a common axis and which define a clutch housing therebetween. A clutch pack is interposed between the drive and driven members and is operable to connect and disconnect the drive and driven members for transferring and interrupting torque therebetween. A piston assembly is supported in the clutch housing and defines an expandable chamber between the piston assembly and the clutch housing. A source of pressurized fluid is in communication with the expandable chamber. The piston assembly is responsive to the pressure of fluid in the expandable chamber to move between disengaged and engaged positions thereby actuating the clutch pack to connect and disconnect the drive and driven members.

The piston assembly includes a main body having an outer ring annularly disposed about the main body. The outer ring includes at least one orifice extending through the outer ring. The outer ring is movable between a first position wherein the orifice is closed and the drive and driven members are disconnected and a second position wherein the orifice is open to allow flow of pressurized fluid through the orifice and into contact with the clutch pack thereby cooling the clutch pack when the drive and driven members are operatively connected through the clutch pack.

Thus, the piston assembly is operable to control the flow of coolant under pressure from the outer diameter of the clutch pack between the adjacent plates and disks to the inner diameter of the clutch pack to cool same when the drive and driven members are connected. Further, the piston assembly is also operable to stop the flow of pressurized coolant and to evacuate the clutch pack when the drive and driven members are disconnected.

In this way, the friction device of the present invention provides coolant to the clutch pack when coolant is needed, such as when the clutch or brake is engaged, and interrupts coolant to the clutch pack when the coolant is not needed, such as when the clutch or brake is disengaged.

Accordingly, one advantage of the present invention is that a friction device is provided having selective cooling on demand.

Another advantage of the present invention is that a friction device is provided having a forced flow lubrication from the outer diameter of the clutch pack to the inner diameter of the clutch pack against any centrifugal forces resulting in fully wetting the engaged friction surfaces.

Another advantage of the present invention is that viscous shear losses in the coolant are reduced during open pack operation.

Still another advantage of the present invention is that it facilitates the use of a smaller capacity pump when compared with conventional systems which further reduces the cost of the associated transmission, differential or brake system.

Finally, these advantages are achieved in a friction device such as a clutch or brake assembly which is operationally efficient and cost-effective to manufacture relative to the complex systems proposed in the related art.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
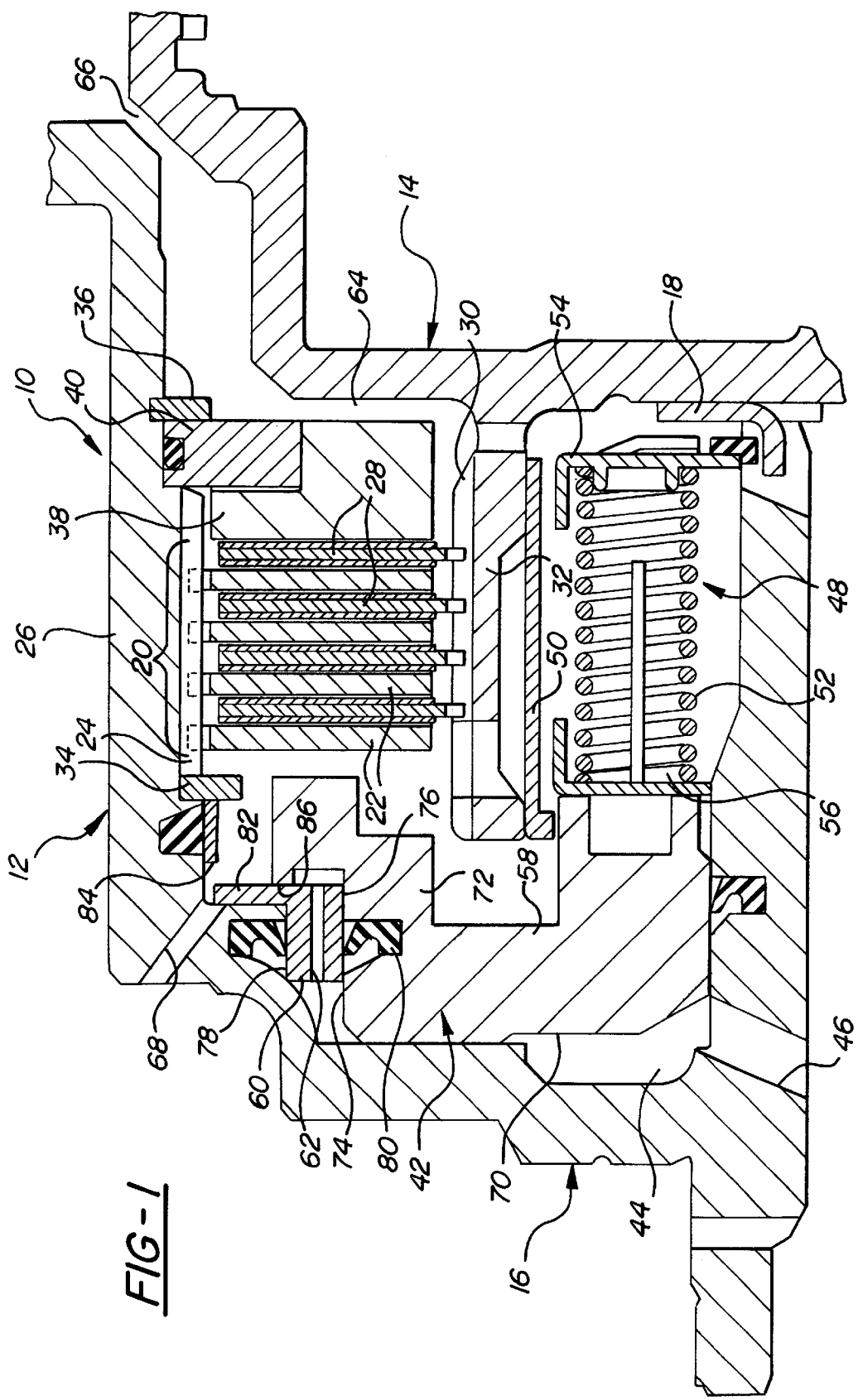
FIG. 1 is a partial cross-sectional side view illustrating the friction device of the present invention operating in an open pack mode.

Referring now to FIG. 1, a friction device such as a clutch or brake assembly of the present invention is generally indicated at 10. The friction device 10 is adapted to be employed in connection with a transmission, differential or brake system. For example only and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 includes a drive member, generally indicated at 12 and a driven member, generally indicated at 14 both of which are rotatable about a common axis (not shown) and which define a clutch housing, generally indicated at 16. A thrust bearing 18 is interposed between the drive and driven members 12, 14, respectively, to address axial loads which can stack up among various components in the transmission.

An annular clutch pack, one half of which is generally indicated by the bracket labeled at 20, is interposed between the drive 12 and driven 14 members and operates to connect and disconnect the drive 12 and driven 14 members for translating and interrupting torque therebetween. The clutch pack 20 includes a plurality of annular plates 22 splined at 24 to a drive hub 26. A plurality of annular friction disks 28 are splined at 30 to the driven hub 32 and interleaved between the plates 22. Together, the plates 22 and disks 28 of the annular clutch pack 20 define an outer diameter roughly at the spline 24 of the drive hub 26 and an inner diameter roughly at the splines 30 of the driven hub 32. In one disposition shown in FIG. 1, the plates 22 and friction disks 28 rotate past one another in non-contacting relationship. The plates 22 and friction disks 28 are also axially movable relative to their respective splined hubs 26, 32 to come into frictional engagement, thereby reducing or eliminating relative rotation between the plates 22 and disks 28. A pair of retaining rings 34, 36 are mounted to the drive hub 26 and are disposed on either side of the clutch pack 20. A pressure plate 38 with an O-ring gland 40 also cooperate with the retaining ring 36 to limit axial movement of the plates 22 and friction disks 28. When the disks and plates are engaged, the clutch pack 20 is sealed at its outer diameter.

This axial movement is achieved through the actuation of a piston assembly, generally indicated at 42 which is supported in the clutch housing 16. The piston assembly 42 and the clutch housing 16 cooperate to define an expandable chamber 44 between the piston assembly 42 and the clutch housing 16. A source of pressurized fluid is in communication with the expandable chamber via pressure port 46. The piston assembly 42 is responsive to the pressure of fluid in the expandable chamber 44 to move between disengaged and engaged positions thereby actuating the clutch pack 20 to connect and disconnect drive and driven members 12, 14, respectively, as mentioned above.

Figure 2:
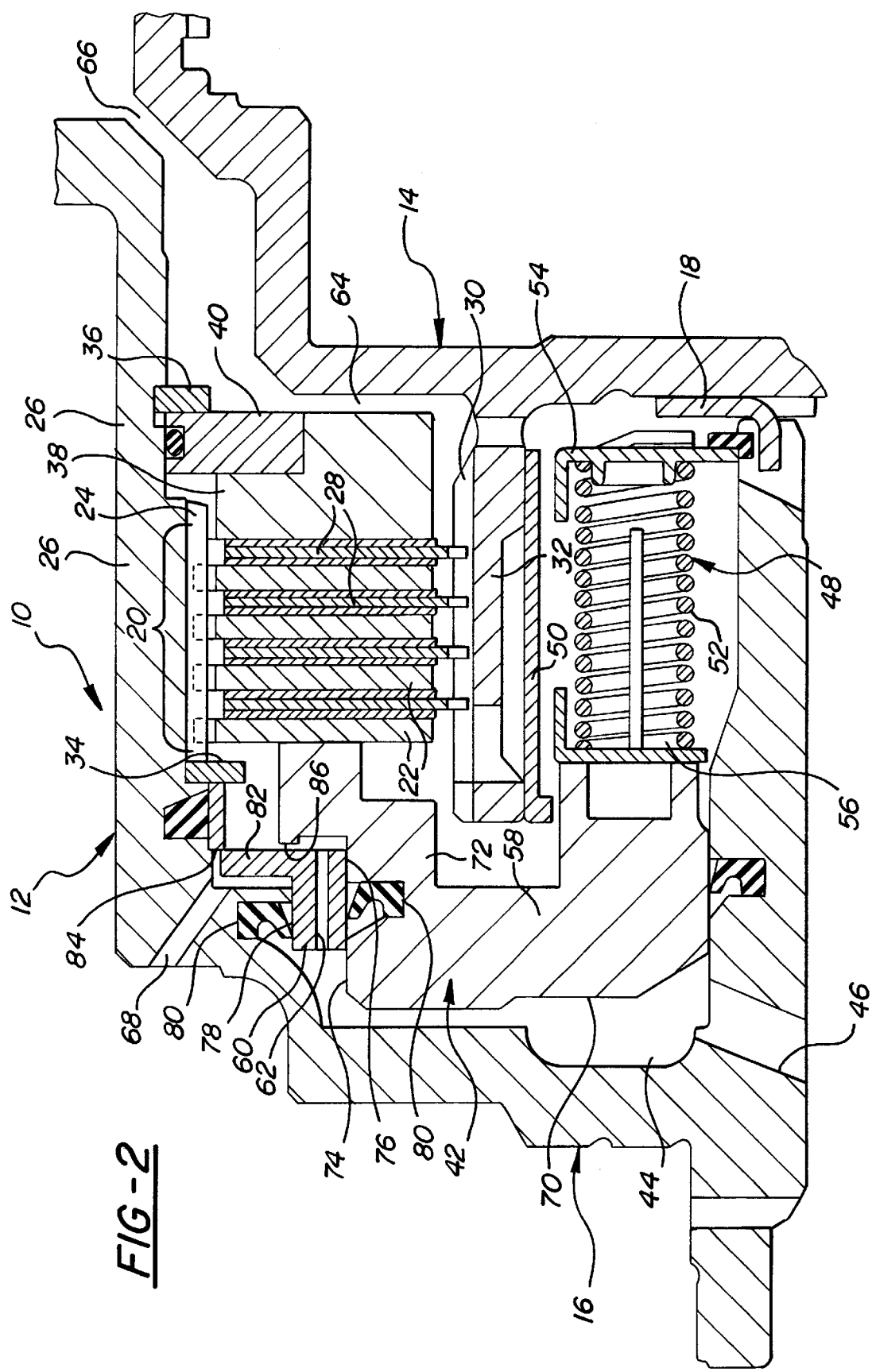
FIG. 2 is a partial cross-sectional side view of the friction device shown in FIG. 1 wherein the clutch or brake is engaged.

A biasing member, generally indicated at 48, may be employed to move the piston assembly 42 to its disengaged position. This biasing member 48 is supported in the clutch housing 16 beneath a lube dam 50 located on the under side of the driven hub 32. As illustrated in FIGS. 1 and 2, the biasing member is a return spring assembly 48 having a coiled spring 52 captured within a retainer 54 with one end 56 of the spring 52 biased against the piston assembly 42. It will be appreciated by those having ordinary skill in the art that the roles of the expandable chamber 44 and biasing member 48 may be reversed such that the biasing member 48 is employed to engage the clutch pack 20. Further, it will also be appreciated that the biasing member 48 may include any biasing mechanism conventionally known in the art and is not limited to a coiled spring.

As alluded to above, just before the clutch pack 20 is engaged, the plates 22 and disks 28 come into frictional contact with one another until the relative rotational speed between the plates 22 and disks 28 becomes zero. In this disposition, the plates 22 and disks 28 are either rotating together at one speed or are both held against rotation, depending on the particular application in a transmission, differential or brake system. In any case, during the engagement of the plates 22 and disks 28, kinetic energy is converted to thermal energy and a considerable amount of heat is generated. This heat must be dissipated.

To this end, the piston assembly 42 includes a main body 58 having an outer ring 60 annularly disposed about the main body 58. The outer ring 60 includes at least one, but preferably a plurality of, orifices 62 extending through the outer ring 60 and arcuately spaced relative to one another about a common axis. The outer ring 60 is movable independent of the main body 58 of the piston assembly 42 between a first position shown in FIG. 1 wherein the orifices 62 are closed and the drive and driven members 12, 14 are disconnected and a second position shown in FIG. 2 wherein the orifices 62 are open to allow flow of pressurized fluid from the expandable chamber 44 through the orifices 62 and into contact with the clutch pack 20. In the disposition shown in FIG. 2, the clutch housing 16 is sealed at the outer diameter of the clutch pack 20. The pressurized fluid fills the clutch housing 16 from the outer diameter to the inner diameter of the clutch pack 20. More specifically, the pressurized fluid moves from the drive hub 26 across the plates 22 and friction disks 28 against any centrifugal forces acting through the clutch pack 20 to the driven hub 32. Each of the plates 22 and friction disks 28 may include grooves to facilitate cooling of the frictional surfaces. However, the flow of coolant under pressure from the outer diameter to the inner diameter of the clutch pack ensures full wetting of the frictional surfaces and this improves the cooling efficiency of the clutch. Movement of the coolant against the direction of common centrifugal forces also ensures that the coolant will not degrade into droplets or otherwise atomize in the clutch pack 20. The pressurized fluid, typically ATF, thus cools the clutch pack 20 when the drive and driven members are operatively connected. Excess fluid may exit the clutch housing 16 via opening 64 adjacent pressure plate 36 and flows out drain 66 to an ATF sump (not shown).

The friction assembly 10 also includes at least one, but preferably a plurality of exhaust ports 68 formed in the clutch housing 16, in this case the drive hub 26. The outer ring 60 is movable to open the exhaust port 68 to drain pressurized fluid away from the clutch pack 20 when the drive and driven members 12, 14 are disconnected (FIG. 1). In addition, the outer ring 60 is movable to close the exhaust port 68 when the drive and driven members 12, 14 are connected (FIG. 2). Thus, when the clutch pack 20 is open and relatively little heat is generated, the exhaust port 68 is open, no fluid flows through the orifices 62 in the outer rings 60 and any fluid in the housing 16 may be drained through the exhaust port 68. However, when the clutch pack 20 is engaged, the exhaust port 68 is closed by the outer ring 60 as will be discussed in greater detail below.

To facilitate the relative movement of the outer ring 60 to the main body 58, the main body 58 includes a first portion 70 extending generally radially outward relative to the common axis of rotation and a second portion 72 extending generally axially relative to the common axis of rotation. The second portion 72 defines a peripheral support surface 74. The outer ring 60 is axially supported by the peripheral support surface 74 between the its first and second positions. Furthermore, the peripheral support surface 74 is slidably movable relative to the outer ring 60 after the outer ring 60 has reached its second position (FIG. 2) and before the outer ring 60 begins moving from its second position to its first position.

The outer ring 60 defines an inner and outer diameter shown at 76, 78, respectively. Elastomeric seals 80 are disposed about the inner and outer diameters 76, 78. The outer ring 60 includes a shoulder 82 extending radially from the outer diameter 78 which engages the clutch housing 16 to define the first position of the outer ring 60. In addition, the clutch housing 16 has a stop member 84 which cooperates with the shoulder 82 to define the second position wherein the orifices 62 are open and the exhaust port 68 is closed (FIG. 2). The stop member is a radially inwardly extending flange or ring 84. The shoulder 82 on the outer ring 60 comes into abutting relation with the flange 84 at its second position.

The main body 58 of the piston assembly 42 has a return member 86 which also cooperates with the radial shoulder 82 of the outer ring 60 to move the ring 60 from its second position to its first position wherein the orifices 62 are closed and the exhaust port 68 is open. The return member is a flange 86 positioned radially outward from the distal end of the radial support surface 74 of the main body 58 of the piston assembly 42 and extending axially toward the outer ring 60. The flange 86 comes into abutting engagement with the outer ring 60 when the main body 58 of the piston assembly 42 is biased to its disengaged position by the biasing member 48.

Figure 3:
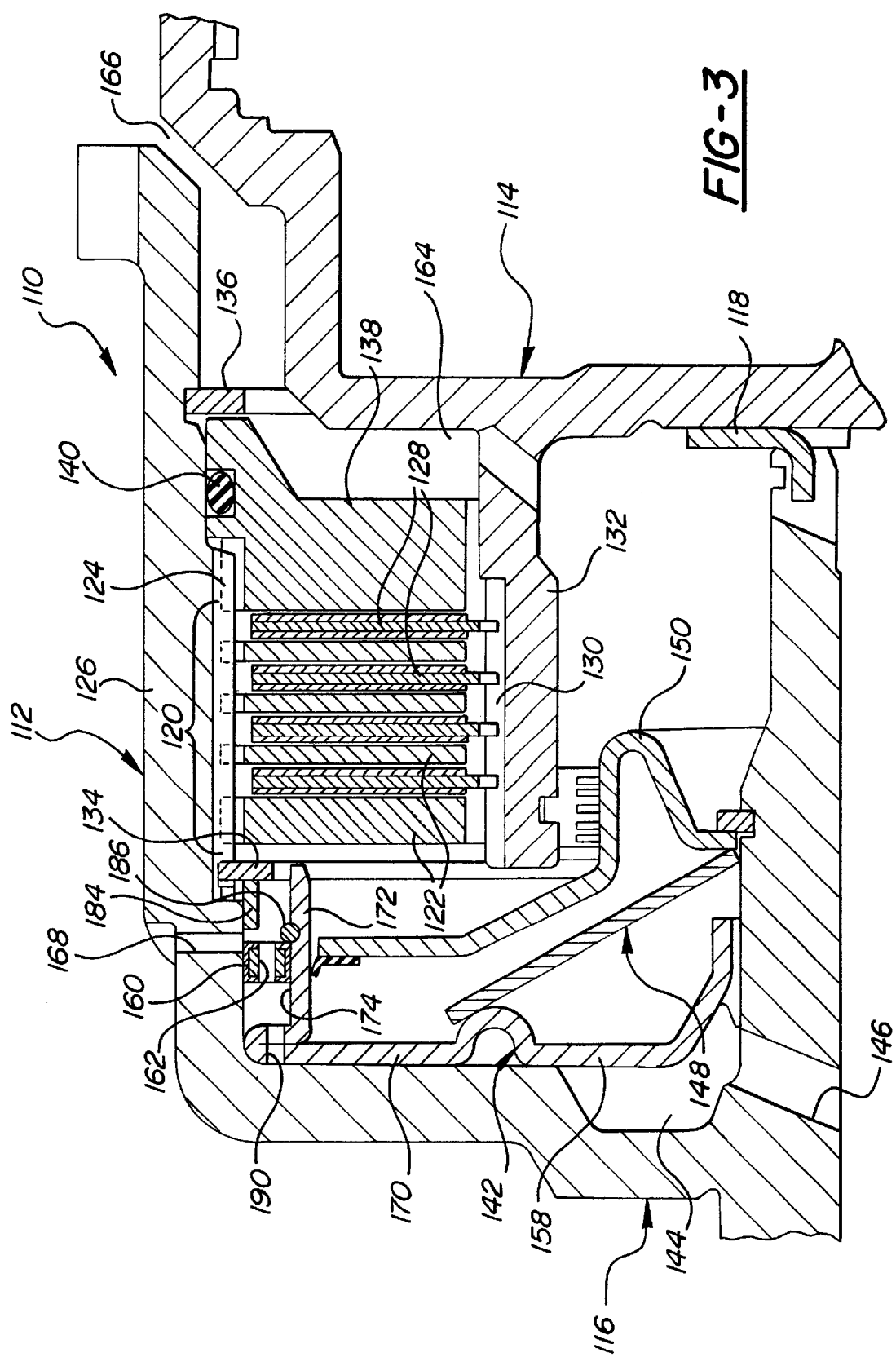
FIG. 3 is a partial cross-sectional side view of another embodiment of the friction device of the present invention shown operating in open pack mode.
Figure 4:
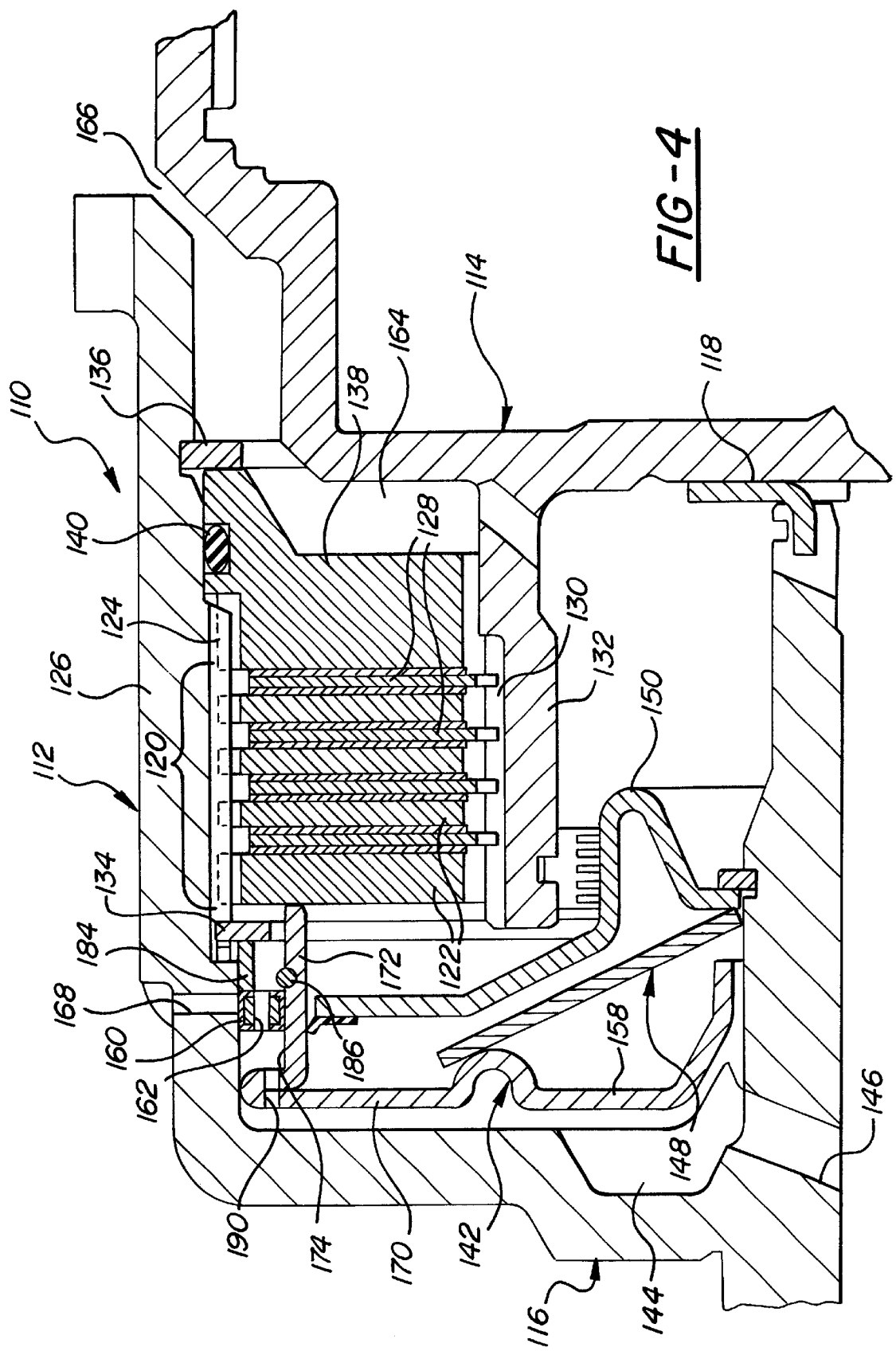
FIG. 4 is a partial cross-sectional side view of the friction device illustrated in FIG. 3 wherein the clutch or brake is engaged.

Referring now to FIGS. 3 and 4 where like numerals which have been increased by 100 are used to designate like structure, another embodiment of the friction device of the present invention is generally indicated at 110. The friction device 110 includes a drive member, generally indicated at 112 and a driven member, generally indicated at 114 both of which are rotatable about a common axis (not shown) and which define a clutch housing, generally indicated at 116. A thrust bearing 118 is interposed between the drive and driven members 112, 114, respectively, to address axial loads which can stack up among various components in the transmission.

An annular clutch pack, one half of which is generally indicated by the bracket labeled at 120, is interposed between the drive 112 and driven 114 members and operates to connect and disconnect the drive 112 and driven 114 members for translating and interrupting torque therebetween. The clutch pack 120 includes a plurality of annular plates 122 splined at 124 to a drive hub 126. A plurality of annular friction disks 128 are splined at 130 to the driven hub 132 and interleaved between the plates 122. Together, the plates 122 and disks 128 of the annular clutch pack 120 define an outer diameter roughly at the spline 124 of the drive hub 126 and an inner diameter roughly at the splines 130 of the driven hub 132. In one disposition shown in FIG. 3, the plates 122 and friction disks 128 rotate past one another in non-contacting relationship. The plates 122 and friction disks 128 are also axially movable relative to their respective splined hubs 126, 132 to come into frictional engagement, thereby reducing or eliminating relative rotation between the plates 122 and disks 128. A pair of retaining rings 134, 136 are mounted to the drive hub 126 and are disposed on either side of the clutch pack 120. A pressure plate 138 with an O-ring gland 140 also cooperate with the retaining ring 136 to limit axial movement of the plates 122 and friction disks 128. When the disks and plates are engaged, the clutch pack 120 is sealed at its outer diameter.

This axial movement is achieved through the actuation of a piston assembly, generally indicated at 142 which is supported in the clutch housing 116. The piston assembly 142 and the clutch housing 116 cooperate to define an expandable chamber 144 between the piston assembly 142 and the clutch housing 116. A source of pressurized fluid is in communication with the expandable chamber via pressure port 146. The piston assembly 142 is responsive to the pressure of fluid in the expandable chamber 144 to move between disengaged and engaged positions thereby actuating the clutch pack 120 to connect and disconnect drive and driven members 112, 114, respectively, as mentioned above.

A biasing member, generally indicated at 148, may be employed to move the piston assembly 142 to its disengaged position. This biasing member 148 is supported in the clutch housing 116 left of a balance dam 150. As illustrated in FIGS. 3 and 4, the biasing member is a Belville spring 148 captured between the piston assembly 142 and the balance dam 150. It will be appreciated by those having ordinary skill in the art that the roles of the expandable chamber 144 and biasing member 148 may be reversed such that the biasing member 148 is employed to engage the clutch pack 120. Further, it will also be appreciated that the biasing member 148 may include any biasing mechanism conventionally known in the art and is not limited to a Belville spring.

As alluded to above, just before the clutch pack 120 is engaged, the plates 122 and disks 128 come into frictional contact with one another until the relative rotational speed between the plates 122 and disks 128 becomes zero. In this disposition, the plates 122 and disks 128 are either rotating together at one speed or are both held against rotation, depending on the particular application in a transmission, differential or brake system. In any case, during the engagement of the plates 122 and disks 128, kinetic energy is converted to thermal energy and a considerable amount of heat is generated. This heat must be dissipated.

To this end, the piston assembly 142 illustrated in FIGS. 3 and 4 includes a main body 158 having an outer ring 160 annularly disposed about the main body 158. The outer ring 160 includes at least one, but preferably a plurality of, orifices 162 extending through the outer ring 160 and arcuately spaced relative to one another about a common axis. The outer ring 160 is movable independent of the main body 158 of the piston assembly 142 between a first position shown in FIG. 3 wherein the orifices 162 are closed and the drive and driven members 112, 114 are disconnected and a second position shown in FIG. 4 wherein the orifices 162 are open to allow flow of pressurized fluid from the expandable chamber 144 through the orifices 162 and into contact with the clutch pack 120. In the disposition shown in FIG. 4, the clutch housing 116 is sealed. at the outer diameter of the clutch pack 120. The pressurized fluid fills the clutch housing 116 from the outer diameter to the inner diameter of the clutch pack 120. More specifically, the pressurized fluid moves from the drive hub 126 across the plates 122 and friction disks 128 against any centrifugal forces acting through the clutch pack 120 to the driven hub 132. Each of the plates 122 and friction disks 128 may include grooves to facilitate cooling of the frictional surfaces. However, the flow of coolant under pressure from the outer diameter to the inner diameter of the clutch pack ensures full wetting of the frictional surfaces and this improves the cooling efficiency of the clutch. Movement of the coolant against the direction of common centrifugal forces also ensures that the coolant will not degrade into droplets or otherwise atomize in the clutch pack 120. The pressurized fluid, typically ATF, thus cools the clutch pack 120 when the drive and driven members are operatively connected. Excess fluid may exit the clutch housing 116 via opening 164 adjacent pressure plate 136 and flows out drain 166 to an ATF sump (not shown).

The friction device 110 also includes at least one, but preferably a plurality of exhaust ports 168 formed in the clutch housing 116, in this case the drive hub 126. The outer ring 160 is movable to open the exhaust port 168 to drain pressurized fluid away from the clutch pack 120 when the drive and driven members 112, 114 are disconnected (FIG. 3). In addition, the outer ring 160 is movable to close the exhaust port 168 when the drive and driven members 112, 114 are connected (FIG. 4). Thus, when the clutch pack 120 is open and relatively little heat is generated, the exhaust port 168 is open, no fluid flows through the orifices 162 in the outer rings 160 and any fluid in the housing 116 may be drained through the exhaust port 168. However, when the clutch pack 120 is engaged, the exhaust port 168 is closed by the outer ring 160 as will be discussed in greater detail below.

To facilitate the relative movement of the outer ring 160 to the main body 158, the main body 158 includes a first portion 170 extending generally radially outward relative to the common axis of rotation and a second portion 172 extending generally axially relative to the common axis of rotation. The second portion 172 defines a peripheral support surface 174. The outer ring 160 is axially supported by the peripheral support surface 174 between its first and second positions. Furthermore, the peripheral support surface 174 is slidably movable relative to the outer ring 160 after the outer ring 160 has reached its second position (FIG. 4) and before the outer ring 160 begins moving from its second position to its first position. In addition to the orifices 162, at least one but preferably a plurality of, flow passages 190 are defined in the first portion 170 of the main body 158 of the piston assembly 142 for controlling the flow of pressurized fluid from the expandable chamber 144 through the plurality of orifices 162 in the outer ring 160. As is shown in FIGS. 3 and 4, the plurality of flow passages 190 are closed when the piston assembly 142 is in the disengaged position where it is biased by the Belville spring 148 to the left as viewed in this Figure. However, the flow passages 190 are open when the piston assembly 142 is in the engaged position as shown in FIG. 4. Thus, in the embodiment illustrated in FIGS. 3 and 4, the flow of pressurized coolant to the outer ring 160 is controlled through the flow passages 190 in the first portion 170 of the main body 158 of the piston assembly 142.

In addition, the clutch housing 116 has a stop member 184 which cooperates with the outer ring 160 to define the second position wherein the orifices 162 are open and the exhaust port 168 is closed (FIG. 4). The stop member is a radially inwardly extending flange or ring 184. The outer ring 160 comes into abutting relation with the flange 84 at its second position.

The main body 158 of the piston assembly 142 has a return member 186 which also cooperates with the outer ring 160 to move the ring 160 from its second position to its first position wherein the orifices 162 are closed and the exhaust port 168 is open. In the embodiment illustrated in FIGS. 3 and 4, the return member includes an annular bead 186 disposed about the peripheral support surface 164 of the main body 158 of the piston assembly 142. The bead 186 engages the outer ring 160 to move the outer ring 160 from its second position to its first position.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. a friction device comprising:
a drive member and a driven member which are rotatable about a common axis and which define a clutch housing therebetween;
a clutch pack interposed between said drive and driven members and operable to connect and disconnect said drive and driven members for transferring and interrupting torque therebetween;
a piston assembly supported in said clutch housing and defining an expandable chamber between said piston assembly and said clutch housing;
a source of pressurized fluid in communication with said expandable chamber, said piston assembly being responsive to the pressure of fluid in said expandable chamber to move between disengaged and engaged positions thereby actuating said clutch pack to connect and disconnect said drive and driven members;
said piston assembly including a main body having an outer ring disposed about said main body, said outer ring including a plurality of orifices extending through said outer ring and arcuately spaced relative to one another about said common axis;
said outer ring being movable between a first position wherein said orifice is closed and said drive and driven members are disconnected and a second position wherein said orifice is open to allow flow of pressurized fluid through said orifice and into contact with said clutch pack thereby cooling same when said drive and driven members are operatively connected through said clutch pack.

2. A friction device as set forth in claim 1 wherein said pressurized fluid flows from said expandable chamber through said at least one orifice and into contact with said clutch pack.

3. A friction device as set forth in claim 1 wherein said main body includes a peripheral support surface, said outer ring being disposed about said peripheral support surface and being axially supported between said first and second position and wherein said peripheral support surface is slidably movable relative to said outer ring after said ring has reached its second position and before said outer ring begins moving from said second position to said first position.

4. A friction device as set forth in claim 1 wherein said friction device includes at least one exhaust port, said outer ring being movable to open said exhaust port to drain pressurized fluid away from said clutch pack when said drive and driven members are disconnected and movable to close said exhaust port when said drive and driven members are connected.

5. A friction device as set forth in claim 4 wherein said clutch housing has a stop member which cooperates with said outer ring to define said second position wherein said orifice is open and said exhaust port is closed.

6. A friction device as set forth in claim 5 wherein said stop member is a radially inwardly extending flange, said outer ring coming into abutting relation with said flange at said second position.

7. A friction device as set forth in claim 4 wherein said main body of said piston assembly has a return member which cooperates with said outer ring to move said ring from said second position to said first position wherein said at least one orifice is closed and said exhaust port is open.

8. A friction device as set forth in claim 7 wherein said return member is a flange disposed radially outward from said peripheral support surface of said main body of said piston assembly, said flange coming into abutting engagement with said outer ring to close said orifice and to move said outer ring from said second position to said first position.

9. A friction device as set forth in claim 7 wherein said return member includes an annular bead disposed about said peripheral support surface of said main body of said piston assembly, said bead engaging said outer ring to move said outer ring from said second position to said first position.

10. A friction device as set forth in claim 1 wherein said outer ring has a radially extending outer shoulder which engages said clutch housing to define said first position of said outer ring.

11. A friction device as set forth in claim 1 wherein said main body of said piston assembly includes a first portion extending generally radially outward relative to said common axis of rotation and a second portion extending generally axially relative to said common axis of rotation, said second portion defining a peripheral support surface of said main body, said outer ring being carried by said peripheral support surface, a plurality of flow passages defined in said first portion of said main body of said piston assembly for controlling the flow of pressurized fluid from said expandable chamber through said plurality of orifices in said outer ring, wherein said plurality of flow passages are closed when said piston assembly is in said disengaged position and said plurality of flow passages are open when said piston is in said engaged position.

12. A friction device comprising:
a drive member and a driven member which are rotatable about a common axis and which define a clutch housing therebetween;
an annular clutch pack having an inner diameter and an outer diameter, said clutch pack being operable to connect and disconnect said drive and driven members for transferring and interrupting torque therebetween;
a piston assembly supported in said clutch housing and defining an expandable chamber between said piston assembly and said clutch housing, said piston assembly including a main body having outer ring annularly disposed about said main body, said outer ring including a plurality of orifices extending through said outer ring arcuately spaced relative to one another about said common axis, said outer ring being movable between a first position wherein said orifices are closed and said drive and driven members are disconnected and a second position wherein said orifices are open to allow flow of pressurized fluid through said orifices and into contact with said clutch pack thereby cooling same when said drive and driven members are operatively connected through said clutch pack;

a source of pressurized fluid in communication with said expandable chamber, said piston assembly being responsive to the pressure of fluid in said expandable chamber to move between disengaged and engaged positions thereby actuating said clutch pack to connect and disconnect said drive and driven members;

said piston assembly also operable to control the flow of coolant under pressure from said outer diameter of said clutch pack between said adjacent plates and disks to said inner diameter of said clutch pack to cool same when said drive and driven members are connected and to stop the flow of pressurized coolant to said clutch pack when said drive and driven members are disconnected.

13. A friction device as set forth in claim 12 wherein said pressurized fluid flows from said expandable chamber through said orifices and into contact with said clutch pack.

14. A friction device as set forth in claim 12 wherein said main body includes a peripheral support surface, said outer ring being disposed about said peripheral support surface and being axially supported between said first and second position and wherein said peripheral support surface is slidably movable relative to said outer ring after said ring has reached its second position and before said outer ring begins moving from said second position to said first position.

15. A friction device as set forth in claim 12 wherein said friction device includes at least one exhaust port, said outer ring being movable to open said exhaust port to drain pressurized fluid away from said clutch pack when said drive and driven members are disconnected and movable to close said exhaust port when said drive and driven members are connected.

16. A friction device as set forth in claim 15 wherein said clutch housing has a stop member which cooperates with said outer ring to define said second position wherein said orifices are open and said exhaust port is closed, and wherein said main body of said piston assembly has a return member which cooperates with said outer ring to move said ring from said second position to said first position wherein said orifices are closed and said exhaust port is open.

17. A friction device as set forth in claim 12 wherein said outer ring has a radially extending outer shoulder which engages said clutch housing to define said first position of said outer ring.

18. A friction device as set forth in claim 12 wherein said main body of said piston assembly includes a first portion extending generally radially outward relative to said common axis of rotation and a second portion extending generally axially relative to said common axis of rotation, said second portion defining a peripheral support surface of said main body, said outer ring being carried by said peripheral support surface, a plurality of flow passages defined in said first portion of said main body of said piston assembly for controlling the flow of pressurized fluid from said expandable chamber through said plurality of orifices in said outer ring, wherein said plurality of flow passages are closed when said piston assembly is in said disengaged position and said plurality of flow passages are open when said piston is in said engaged position.

* * * * *